United States Patent
Fujita et al.

(10) Patent No.: US 7,237,105 B2
(45) Date of Patent: Jun. 26, 2007

(54) STARTUP SYSTEM AND METHOD USING BOOT CODE

(75) Inventors: Norio Fujita, Shiga-ken (JP); Masahiro Murakami, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/841,902

(22) Filed: May 7, 2004

(65) Prior Publication Data
US 2004/0250057 A1      Dec. 9, 2004

(30) Foreign Application Priority Data
May 7, 2003    (JP)    ............... 2003-128957

(51) Int. Cl.
G06F 9/445      (2006.01)
G06F 15/177     (2006.01)

(52) U.S. Cl. .............. 713/2; 713/1; 713/100; 714/36

(58) Field of Classification Search ............ None
See application file for complete search history.

(56) References Cited

U.S. PATENT DOCUMENTS

| | | | |
|---|---|---|---|
| 5,379,431 A | * | 1/1995 | Lemon et al. ............ 710/10 |
| 5,615,392 A | * | 3/1997 | Harrison et al. .......... 710/56 |
| 6,058,474 A | * | 5/2000 | Baltz et al. ............... 713/1 |
| 6,286,097 B1 | * | 9/2001 | Chang et al. ............. 713/2 |
| 6,463,530 B1 | * | 10/2002 | Sposato .................. 713/2 |
| 6,598,137 B1 | * | 7/2003 | Yaegawa et al. .......... 711/165 |

FOREIGN PATENT DOCUMENTS

| | | | | |
|---|---|---|---|---|
| JP | 02128269 A | * | 5/1990 | |
| JP | 63067633 A | * | 3/1998 | |
| JP | 11-143718 | | 5/1999 | |
| JP | 2000-112762 | | 4/2000 | |

* cited by examiner

*Primary Examiner*—Rehana Perveen
*Assistant Examiner*—Nitin C. Patel
(74) *Attorney, Agent, or Firm*—Yuanmin Cai

(57) ABSTRACT

A startup system using a boot code includes an external memory storing a boot code, a buffer connected to an external memory for storing the boot code transferred from the external memory, a DMA controller for commanding transfer of the boot code from the external memory to the buffer, and a mapping circuit connected to the buffer for mapping the boot code stored in the buffer onto a CPU. Accordingly, a flash ROM for storing the boot code may be eliminated, thereby reducing system cost.

10 Claims, 3 Drawing Sheets

STARTUP SYSTEM AND METHOD USING BOOT CODE

FIELD OF THE INVENTION

The present invention relates to a startup system and method for starting a system such as a personal computer that uses a boot code adapted to carry out a boot operation, in cases where the personal computer is not provided with a read only memory (ROM) for storing the boot code.

BACKGROUND OF THE INVENTION

A typical system such as a computer or a game device comprises a ROM storing therein software that is executed at power on (hereinafter, this software will be referred to as "boot code"). This ROM has a bus width narrower than a bus width of a central processing unit (CPU), and has an access speed which is also low. Therefore, in many systems, the boot code is executed after having been transferred to a random access memory (RAM) which is capable of high-speed access.

Specifically, referring to FIG. 3, immediately after power on, a CPU 20 jumps to an address of a flash ROM 26 mounted on a motherboard to execute the contents of the flash ROM 26. Then, the CPU 20 transfers a boot code from the flash ROM 26 to a main memory 24 and executes the boot code on the main memory 24. Through the execution of the boot code, various controllers, secondary storage devices (floppy disk drive, hard disk drive (HDD), CD-ROM drive, etc.), and other devices are initialized, and an operating system is transferred to the main memory 24. The flash ROM 26 has a function of retaining internal data even when the power is turned off, and therefore in a conventional system is an essential component for starting up the system.

On the other hand, in order to achieve reduction in cost of the product, it is often desirable to decrease the number of components. This approach has been employed also in personal computers and game devices. Techniques have been proposed in Japanese patent publications JP-A-H11-143718 and JP-A-2000-112762, which aim to achieve reduction in cost of the product by eliminating the flash ROM 26 storing the boot code.

In the technique described in JP-A-H11-143718, a dedicated flash ROM for storing a basic input/output system (BIOS) (equivalent to "boot code" in the present invention) is not used, which simplifies the configuration of a small-sized computer, thus achieving reduction in cost. The BIOS is instead stored in a predetermined area of an HDD, and an HDD controller maps the BIOS stored in the HDD onto a RAM under the control of a memory controller. The BIOS is executed on the RAM after the BIOS stored in the HDD has been transferred to the RAM under the control of the memory controller. This means that the memory controller is provided with a memory storing a program for transfer of the BIOS, and an arithmetic unit. This causes the memory controller to carry out processing apart from ordinary processing. Consequently, inasmuch as a memory controller having high processing capability is required, the cost of the memory controller is increased, which offsets the reduction in cost obtained by eliminating the flash ROM.

In the technique of JP-A-2000-112762, a system BIOS is stored in a dedicated storage area of an HDD, and a mechanism is provided for reading and executing the system BIOS upon system startup, thereby eliminating a flash ROM for storing the system BIOS. A microcomputer provided inside the HDD serves as the mechanism for reading and executing the BIOS upon system startup. In this approach the added cost of providing the microcomputer offsets the cost reduction from eliminating the flash ROM.

SUMMARY OF THE INVENTION

The present invention provides a startup system which permits elimination of a flash ROM storing a boot code, and more effectively realizes the cost reduction achieved by eliminating the flash ROM. According to the present invention, this is done by storing the boot code in an external memory.

A startup system using a boot code according to the present invention includes an external memory storing a boot code; a buffer connected to the external memory for storing the boot code transferred from the external memory; a DMA controller for commanding transfer of the boot code from the external memory to the buffer; and a mapping circuit connected to the buffer for mapping the boot code stored in the buffer onto a central processing unit.

The present invention also provides a startup method using a boot code. The method includes a step of starting initialization of a system during a time period where a power supply voltage and system clocks are stabilized after power is turned on or a reset command is issued; a step in which a DMA controller commands transfer of a boot code from an external memory to a buffer; a step in which an external memory controller, responsive to receipt of a command from the DMA controller, transfers the boot code stored in the external memory to load it into the buffer; a step in which a mapping circuit judges presence or absence of the boot code loaded in the buffer when a central processing unit comes to read the boot code; a step in which the central processing unit executes the boot code when the boot code is present in the buffer; and a step in which, when the boot code is absent from the buffer, the external memory controller, responsive to receipt of a command from the DMA controller, transfers the boot code from the external memory to the buffer so that the central processing unit executes the boot code.

DETAILED DESCRIPTION OF PREFERRED EMBODIMENTS

Figure 1:
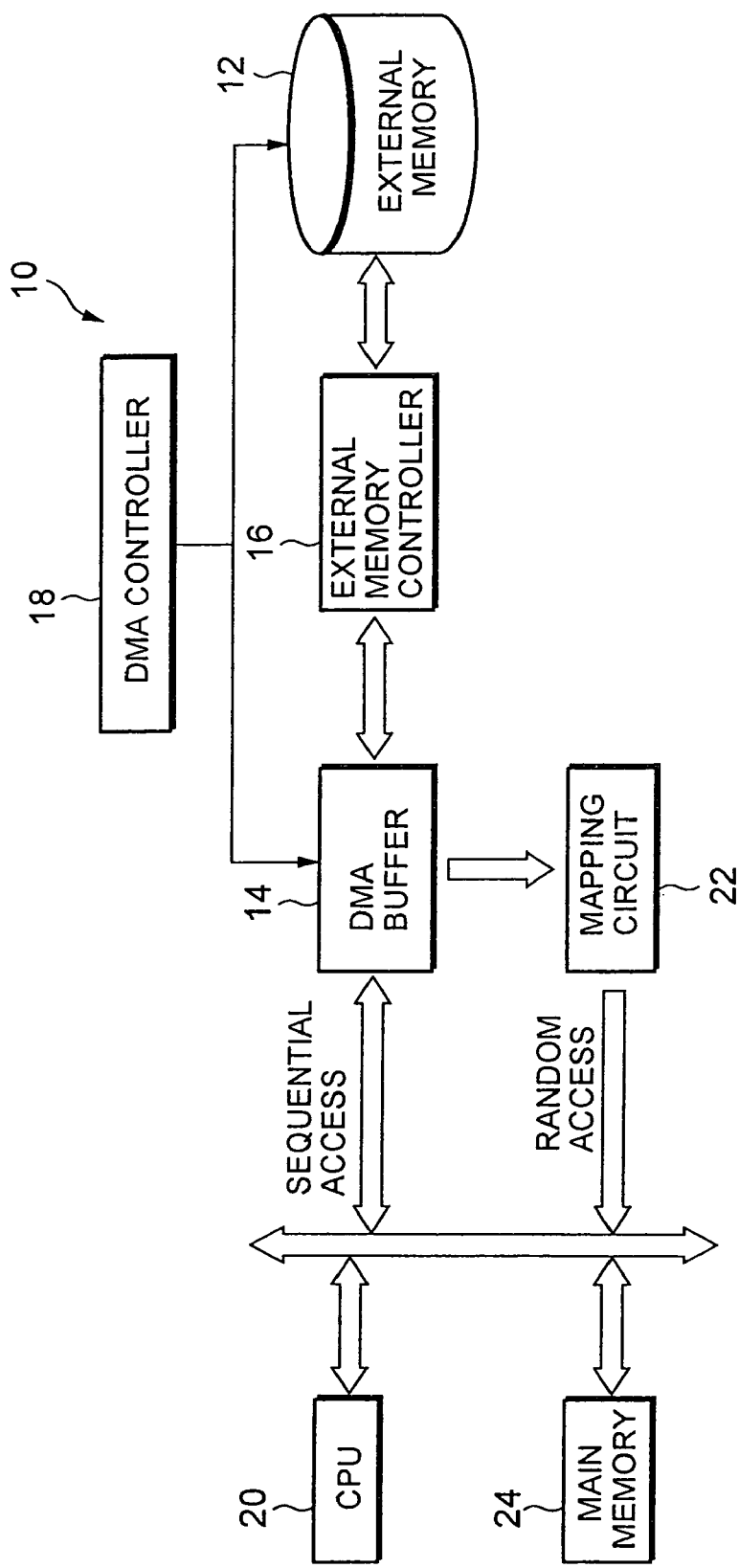
FIG. 1 is a configuration diagram of a startup system using a boot code according to the present invention.
Figure 3:
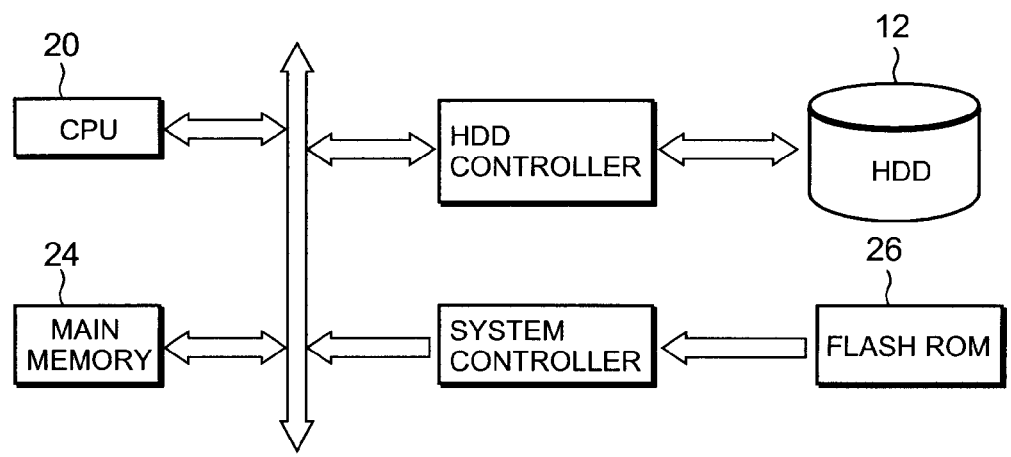
FIG. 3 is a configuration diagram of a conventional startup system using a boot code.

Referring now to the drawings, description will be made of a startup system 10 using a boot code according to a preferred embodiment of the present invention. In FIG. 1, those components having similar functions as the components shown in FIG. 3 are assigned the same reference numerals.

As shown in FIG. 1, the startup system 10 includes an external memory 12 storing a boot code, a buffer 14 connected to the external memory 12 for storing the boot code transferred from the external memory 12, and a direct memory access (DMA) controller 18 for commanding transfer of the boot code from the external memory 12 to the buffer 14. An external memory controller 16 is disposed between the external memory 12 and the buffer 14 for controlling the external memory 12. The system also includes a mapping circuit 22 connected to the buffer 14 for mapping the boot code stored in the buffer 14 onto a CPU 20, and a main memory 24 randomly accessible by the CPU 20 and adapted to receive an operating system transferred via the buffer 14.

In order to eliminate the flash ROM for storing the boot code, this embodiment of the invention has a configuration wherein the boot code is stored in the external memory 12. Further, to realize the cost reduction effect achieved by eliminating the flash ROM, this embodiment has a configuration wherein the mapping circuit 22 is connected to the buffer 14, a command that is issued from the DMA controller 18 to the external memory controller 16 is added, and the external memory controller 16 transfers the boot code.

The external memory 12 may be an HDD connected via an I/O port provided on a motherboard. The boot code for starting the system is stored in a predetermined area of the external memory 12. Alternatively, the external memory 12 may be a floppy disk, or a semiconductor memory device such as a nonvolatile memory represented by a NAND type flash memory.

The buffer 14 is a memory constituting a device that carries out a DMA transfer. The DMA transfer represents a function of transferring data directly from the external memory 12 connected to the I/O port, to the later-described main memory 24 without passing it through the CPU 20. The buffer 14 normally transfers data in a first-in first-out (FIFO) fashion to the main memory 24 without passing it through the CPU 20. In this embodiment, it is noteworthy that the buffer 14 is used as a memory that is randomly accessible by the CPU 20.

The DMA controller 18 normally carries out a function of controlling the DMA transfer. In this embodiment, the DMA controller 18 also carries out a function of issuing the command to the external memory controller 16 to transfer the boot code stored in the predetermined area of the external memory 12 to the buffer 14.

Further, the DMA controller 18 has a function of executing a control such that normal DMA operations are not carried out while the CPU 20 executes the boot code on the buffer 14. This makes it possible for the buffer 14 to function as a memory randomly accessible by the CPU 20 while the CPU 20 executes the boot code on the buffer 14.

The external memory controller 16 includes a sequence circuit which, responsive to receipt of the command from the DMA controller 18, transfers the boot code stored in the external memory 12 to the buffer 14. By the operation of this sequence circuit, the boot code stored in the external memory 12 is loaded into the buffer 14 sequentially in a predefined order. This sequence circuit is formed by the combination of logic circuits.

The CPU 20 has a function of controlling the whole system. In this embodiment, the execution by the CPU 20 of the boot code transferred to the buffer 14 is followed by operations such as initialization of various controllers, then recognition of hardware components (memory, keyboard, video board, disk drive, etc.) and initialization thereof.

The mapping circuit 22 serves to map the boot code stored in the buffer 14 onto the CPU 20. (The buffer 14 is primarily a memory area used for the FIFO operation in the DMA transfer. A counter is generally used in the FIFO operation.) A counter is not used in the mapping operation, which makes it possible that the memory area used for the FIFO operation is used as a memory randomly accessible by the CPU 20. The mapping circuit 22 is formed by a combination of logic circuits. The mapping circuit 22 can also be formed in a chip where the buffer 14 is formed. By the operation of the mapping circuit 22, the CPU 20 can execute the boot code stored in the buffer 14 based on random access.

By providing the mapping circuit 22, the CPU 20 can use the buffer 14 as a randomly accessible memory only during the execution of the boot code by the CPU 20. After the execution of the boot code has been completed, the execution program of the CPU 20 shifts to the operating system, and the buffer 14 is then used as the memory for the DMA transfer.

Inasmuch as the mapping circuit 22 is formed by the combination of the logic circuits, it can exhibit a cache control function. This cache control function is not realized by software, but is realized by hardware in the form of the combined logic circuits. When a boot code to be executed by the CPU 20 is present in the buffer 14, the CPU 20 executes the boot code on the buffer 14. On the other hand, if a boot code to be executed by the CPU 20 is absent from the buffer 14, the DMA controller 18 goes to the external memory 12 to read the boot code; the external memory controller 16 then transfers the boot code stored in the external memory 12 to the buffer 14 to allow the CPU 20 to execute the boot code. The presence or absence of the boot code in buffer 14 is determined by the hardware of the mapping circuit 22.

Owing to the cache control function of the mapping circuit 22, the boot code can be executed on the buffer 14 even if the storage capacity of the buffer 14 is less than the data amount (that is, the overall size) of the boot code. The reason is as follows: The boot code is composed of a plurality of codes, such as codes for initializing various controllers and for transferring the operating system. In this embodiment of the present invention, the storage capacity of the buffer 14 is set according to a data amount of each of the codes forming the boot code. This means that the storage capacity of the buffer 14 is set to a value that can ensure execution of each of all the codes.

If such a code of the boot code to be read by the CPU 20 exists in the buffer 14, the CPU 20 can execute that code. On the other hand, if no such code exists in the buffer, the DMA controller 18 commands the external memory controller 16 to transfer that code of the boot code so that the CPU 20 can execute it. Inasmuch as the storage capacity of the buffer 14 is set to the proper size to allow the execution of each of all the codes forming the boot code, the CPU 20 can therefore execute the whole of the boot code on the buffer 14.

In the startup system 10, the mapping circuit 22 is provided between the buffer 14 and the CPU 20; that is, the mapping circuit 22 is not provided between the main memory 24 and the CPU 20. This is because connection of the mapping circuit 22 (formed by a combination of logic circuits) to the main memory 24 (which is generally exchangeable and expandable) would require the mapping circuit 22 to be complicated and increased in size; this in turn would reduce the advantage of the cost reduction achieved by eliminating the flash ROM.

The main memory 24 is in the form of a randomly accessible memory. The main memory 24 is connected to a bus, for connection to the CPU 20, the buffer 14, and other devices. The operating system stored in the external memory 12 is loaded into the main memory 24 via the buffer 14.

In the startup system 10, the boot code stored in the external memory 12 is transferred to the buffer 14 by the sequence circuit provided in the external memory controller 16. This sequence circuit is formed by a combination of logic circuits, and does not carry out the transfer using particular software. Similarly, the mapping circuit 22 is formed by a combination of logic circuits, and does not carry out a transfer using particular software. Therefore, inasmuch as there is no need for a memory or the like for storing the software, it is possible to fully realize the cost reduction effect achieved by eliminating the flash ROM.

Figure 2:
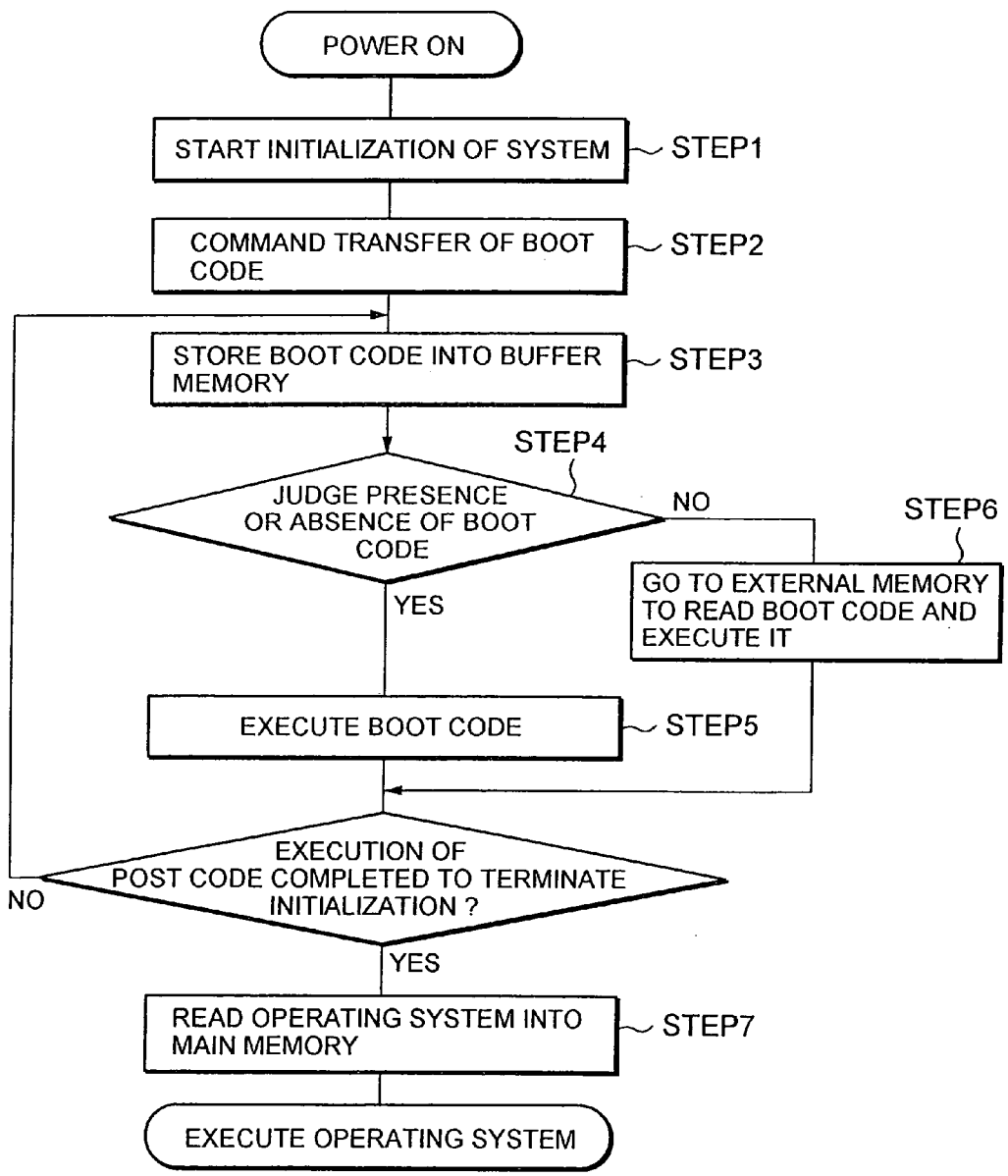
FIG. 2 is a flowchart of a startup method using a boot code according to the present invention.

As shown in FIG. 2, a startup method using a boot code according to the present invention begins with a step of starting initialization of the system, at a stage where a power supply voltage and system clocks are stabilized after the power is turned on or a reset command is issued (step 1). The DMA controller 18 commands transfer of a boot code from the external memory 12 to the buffer 14 (step 2). The external memory controller 16, responsive to receipt of a command from the DMA controller 18, then transfers the boot code stored in the external memory 12 to load it into the buffer 14 (step 3). The mapping circuit 22 judges presence or absence of the boot code loaded in the buffer 14 when the CPU 20 comes to read the boot code (step 4). If the boot code is present in the buffer 14, the CPU 20 executes the boot code (step 5). If the boot code is absent from the buffer 14, the external memory controller 16, responsive to receipt of a command from the DMA controller 18, transfers the boot code from the external memory 12 to the buffer 14 so that the CPU 20 executes the boot code (step 6). After execution of the boot code, the operating system is transferred from the external memory 12 to the main memory 24 via the buffer 14 (step 7).

In step 1, in a system such as a computer, when the power is turned on, or when a reset command is issued by pushing a reset button, initialization of the system is started after the power supply voltage fed to the motherboard and the system clocks are stabilized. Accordingly, the initialization of various controllers mounted on the motherboard, and the recognition and initialization of the hardware components connected to the motherboard, are started.

In step 2, when the initialization of the system is started, the DMA controller 18 issues the command to the external memory controller 16 to transfer the boot code stored in the external memory 12 to the buffer 14. For example, the boot code includes an initial program loader (IPL) code and a power on self test (POST) code. The IPL code is intended mainly for transfer and is formed by codes for transferring the operating system. The POST code is formed by codes for initializing various controllers mounted on the motherboard and for detecting, recognizing, and initializing the hardware components (memory, keyboard, video board, disk drive, etc.) connected to the motherboard. The boot code is stored in the external memory 12 such that the POST code is first executed and then the IPL code is executed. Issuance of the command to the external memory controller 16 from the DMA controller 18 causes the boot code (POST code and IPL code) stored in the external memory 12 to be transferred to the buffer 14 in that order.

In step 3, the boot code stored in the external memory 12 is loaded into the buffer 14 using the external memory controller 16. The POST code and the IPL code are thus transferred and loaded into the buffer 14 in order by means of a transfer using a sequence circuit; that is, transfer from the external memory 12 to the buffer 14 using the combined logic circuits, i.e. without using software.

In step 4, when the boot code starts to be loaded into the buffer 14, the CPU 20 goes to read the buffer 14 via the mapping circuit 22 for executing the boot code. The mapping circuit 22, formed by a combination of logic circuits, judges whether or not the boot code to be read by the CPU 20 exists in the buffer 14.

In step 5, when the boot code to be read by the CPU 20 is present in the buffer 14 as judged in step 4, the CPU 20 executes the boot code on the buffer 14. When the boot code is the POST code, the initialization etc. of some devices is carried out.

In step 6, when the boot code to be read by the CPU 20 is absent from the buffer 14 as judged in step 4, the DMA controller 18 goes to the external memory 12 to read the boot code in question. Then, the external memory controller 16 transfers the boot code in question from the external memory 12 to the buffer 14 so that the CPU 20 executes the boot code in question on the buffer 14.

In step 7, after the initialization of the hardware components is completed in step 5 or step 6, the IPL code loaded in the buffer 14 transfers the operating system to the main memory 24. That is, through the execution by the CPU 20 of the IPL code of the boot code transferred to the buffer 14, the operating system stored in the external memory 12 is transferred to the main memory 24.

When the operating system is transferred to the main memory 24, the CPU 20 starts to execute the operating system. Consequently, the buffer 14 is set to its primary function and used for the FIFO operation in the DMA transfer.

Through the execution of step 1 to step 7, the boot code stored in the external memory 12 is wholly executed on the buffer 14 so that the boot operation, up to the execution of the operating system by the CPU 20, is carried out. Therefore, even if a flash ROM storing the boot code is omitted, it is possible to execute the boot code to start up the system only by adding some circuits.

In the present invention, the boot code is transferred to the buffer 14, and the CPU 20 executes the boot code on the buffer 14. It should be noted that the buffer 14 for the DMA transfer is not normally used until the operating system is started up, while in the present invention the buffer is used as the execution area of the CPU 20 before the system is started up. Accordingly, relatively few circuits need to be added to the system, even if the flash ROM is omitted.

Even if the flash ROM storing the boot code is omitted, by storing the boot code in the external memory 12 and using the buffer 14 for the DMA transfer as the randomly accessible memory, the CPU 20 can use the buffer 14 as the execution area to perform the boot operation.

A startup system using boot code according to the present invention, by storing the boot code for starting up the system in the external memory, has an advantage in that the flash ROM for storing the boot code can be eliminated.

Further, in addition to eliminating the flash ROM for storing the boot code, by adopting a configuration wherein the mapping circuit is connected to the buffer, the command issued from the DMA controller is added, and the boot code is transferred by the external memory controller, it is possible to fully realize the cost reduction achieved by eliminating the flash ROM.

While the invention has been described in terms of specific embodiments, it is evident in view of the foregoing description that numerous alternatives, modifications, and variations will be apparent to those skilled in the art. Accordingly, the invention is intended to encompass all such alternatives, modifications and variations which fall within the scope and spirit of the invention and the following claims.

We claim:

1. A startup system using a boot code, comprising:
   an external memory for storing the boot code;
   a buffer connected to said external memory for storing the boot code transferred from said external memory;

a DMA controller for commanding transfer of the boot code from said external memory to said buffer; and a mapping circuit connected to said buffer for mapping the boot code stored in said buffer onto a central processing unit.

2. A startup system according to claim 1, further comprising:

an external memory controller provided between said external memory and said buffer for transferring the boot code from said external memory to said buffer in response to receipt of a command from said DMA controller; and a main memory randomly accessible by said central processing unit and adapted to receive an operating system transferred from said external memory via said buffer.

3. The startup system according to claim 1, wherein a data storage capacity of said buffer is set in accordance with a data amount of the boot code.

4. The startup system according to claim 1, wherein said mapping circuit is formed by a combination of logic circuits.

5. The startup system according to claim 2, wherein a data storage capacity of said buffer is set in accordance with a data amount of the boot code.

6. The startup system according to claim 2, wherein said mapping circuit is formed by a combination of logic circuits.

7. The startup system according to claim 4, wherein said buffer, said DMA controller, and said mapping circuit are mounted on one chip.

8. The startup system according to claim 6, wherein said buffer, said DMA controller, and said mapping circuit are mounted on one chip.

9. A startup method using a boot code, comprising the steps of:

starting initialization of a system;

judging presence or absence of the boot code loaded in a buffer;

executing the boot code when the boot code is judged to be present in said buffer;

transferring the boot code from an external memory to said buffer when the boot code is judged to be absent from said buffer; and executing the boot code.

10. A startup method using a boot code, comprising:

a step of starting initialization of a system during a period where a power supply voltage and system clocks are stabilized after power is turned on or a reset command is issued;

a step in which a DMA controller commands transfer of a boot code from an external memory to a buffer;

a step in which an external memory controller, responsive to receipt of a command from the DMA controller, transfers the boot code stored in said external memory to load the boot code into the buffer;

a step in which a mapping circuit judges presence or absence of the boot code loaded in the buffer when a central processing unit comes to read the boot code;

a step in which the central processing unit executes the boot code when the boot code is present in the buffer;

a step in which, when the boot code is absent from the buffer, the external memory controller, responsive to receipt of a command from said DMA controller, transfers the boot code from the external memory to said buffer so that the central processing unit executes the boot code; and a step of transferring an operating system from the external memory to a main memory via the buffer.

* * * * *